July 29, 1941.  S. H. MORTENSEN  2,251,152

WINDING FOR ELECTRICAL APPARATUS

Filed July 13, 1940

Inventor
S. H. Mortensen
by
Attorney

Patented July 29, 1941

2,251,152

UNITED STATES PATENT OFFICE 2,251,152

WINDING FOR ELECTRICAL APPARATUS

Sören H. Mortensen, Wauwatosa, Wis., assignor to Allis-Chalmers Manufacturing Company, Milwaukee, Wis., a corporation of Delaware Application July 13, 1940, Serial No. 345,312

16 Claims. (Cl. 171—252)

The invention relates in general to electrical apparatus, and has more particular relation to formed winding coils for such apparatus.

The heretofore commonly used type of connection of leads for field coil windings of certain classes of electrical apparatus, such as rotating field dynamo-electric machines of considerable size, where such windings are formed from edgewise wound copper strap or ribbon, involves the riveting or soldering of an end portion of the current conducting leads in overlapping flatwise relation over an extended area of a terminal portion of the coil winding within the confines of the coil body. This overlapping relation requires an extra portion of the available winding space axially on the pole, as well as additional conductor material in the leads, in order to attain the required mechanical strength and electrical conductivity of the lead connections to the winding and for carrying the lead to its connection to a lead on an adjacent winding coil.

The present invention contemplates the avoidance of prior art limitations or defects associated with lead connections to windings, through the provision of a lead connection from a terminal portion of the formed winding coil, utilizing a butt-connection between the lead and an exposed edge surface only of the winding, thus saving the extra space, as well as the cost of extra copper, that might be required if the lead entered and was laid flatwise on the coil conductor, within the confines of the coil body; and it insures, through such a connection of the lead to an exposed edge surface of the conductor forming the coil, desired flexibility in the matter of selection of the point of connection of the lead to the coil, thus permitting bringing the lead out directly at a point which best facilitates connection of the lead to a lead on an adjacent winding coil or a terminal of the machine, with minimum space requirements for, and thus least obstruction occasioned by, the leads.

It is an object of the present invention to provide an improved design and construction of electrical apparatus embodying a winding coil having a terminal affixed thereto.

It is a further object of the present invention to provide electrical apparatus embodying a formed winding coil composed of superposed convolutions of conductor and provided with a lead connected to an exposed edge portion of the conductor forming the coil by a fused metal butt-joint between the connected parts.

It is a further object of this invention to provide a winding coil of improved design and construction wherein the coil is formed of edgewise wound strap conductor and is provided with a lead connected by a fused butt-joint to an exposed edge surface portion of the coil.

These and other objects and advantages are attained by the present invention, various novel features of which will be apparent from the description herein and the accompanying drawing, illustrating an embodiment of the invention, and will be more particularly pointed out in the annexed claims.

Figure 1:
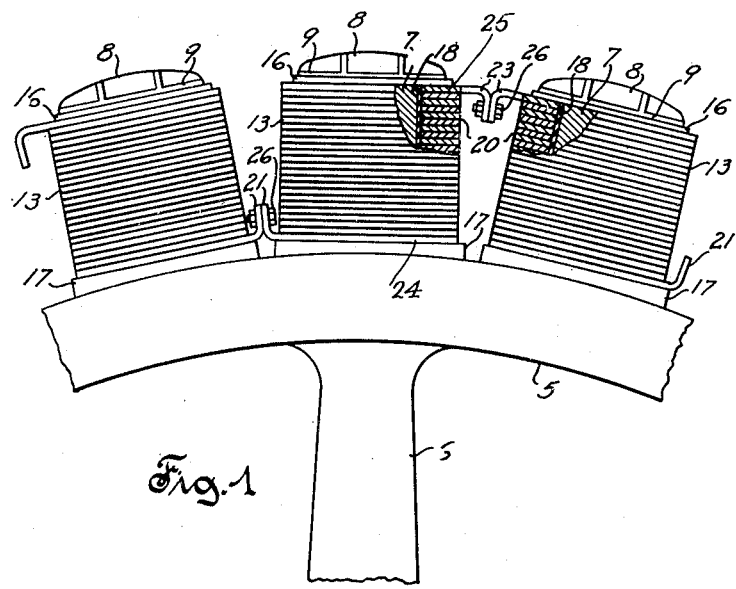
Fig. 1 is a fragmental elevation, with parts in section, of a dynamo-electric machine embodying features of the present invention.

In Fig. 1, there is shown a portion of the annular field core 5 of a rotating field dynamo-electric machine, which may be considered as a synchronous alternating current generator of the type generally designed to be driven by a hydraulic turbine. The annular core 5 is supported, through a plurality of radially extending arms 6 of a spider, from a hub mounted in a conventional manner on the driving shaft of the machine. Spaced about the periphery of the annular core 5, a plurality of projecting field poles 7 are secured to the core 5 in conventional manner, and with their radially outer pole faces 8 suitably formed and disposed for cooperation with the inner periphery of a conventional stationary armature, not shown, of a machine of this type. The field poles are preferably of the laminated type, wherein a bundle of laminations are held assembled between supporting end heads or plates which are provided at their radially outer end with integral extensions 9 in the direction of the axis of the machine, these extensions overlying and acting as support abutments for a field winding coil 13 which is assembled on the pole.

The field winding coil 13 is of strap copper held in position on the body portion of the field pole 7 between radially outer and inner supporting or abutment collars 16 and 17, respectively. These collars are generally rigid in construction and may be of insulating material or of metal, in which latter event they are suitably separated by insulation from the inner and outer convolutions of the coil. A sleeve of insulating material, such as flexible mica, 18 preferably surrounds the body portion of the field pole 7 and serves as a separator between the pole and the winding coil.

The coil 13 is formed by winding a flat strap conductor 19 edgewise to the desired outline shape of the coil, with a strip of insulation 20 between adjacent convolutions of the coil. The conductor 19 from which the coil is formed is shown as being of plain rectangular cross-sectional shape; and, as in conventional practice, the end portions of the conductor, beyond the point of connection of the terminals thereto, lying along the side of the coil are preferably of gradually tapering thickness to insure that the radially outer and inner sides of the formed coil will more closely approach flat surfaces and hence bear more fully against the end collars 16 and 17.

Figure 2:
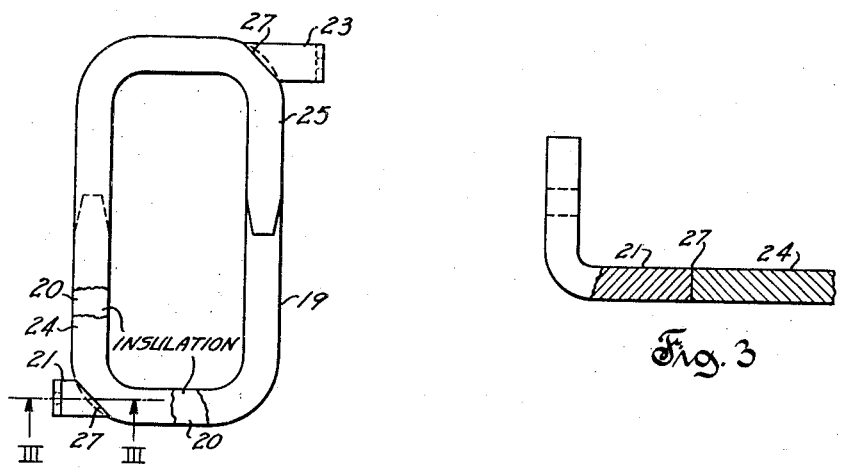
Fig. 2 is a broken plan view of one of the field winding coils of the machine of Fig. 1.
Figure 3:
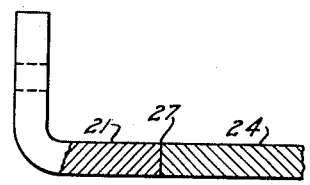
Fig. 3 is a view in elevation, partly in sectional plane of the line III—III of Fig. 2, of a portion of the winding of Figs. 1 and 2.

As more particularly indicated in Fig. 2, showing a broken plan view of the coil for the intermediate field pole in Fig. 1, the coil 13 is provided at its radially inner and outer ends with flat leads of rectangular cross-sectional shape and of substantially the same cross-sectional area as the conductor 19 forming the coil, the leads at the inner and outer ends of the coil being indicated at 21 and 23, respectively. These leads are electrically and mechanically connected to the edge of the radially inner and outer convolutions 24, 25, respectively, adjacent the ends of the conductor forming the coil, through a fused metal butt-connection between the connected parts. For facility in making connection between leads of adjacent coils, with the leads disposed at points most accessible for making such connections, and in order that such leads may be of minimum length and offer minimum obstruction, the lead 21 from the inner convolution 24 of the coil is brought out in substantial prolongation of the side of such convolution lying at the front side of the machine, and the lead 23 from the outer convolution 25 is brought out in substantial prolongation of the side of such convolution at the rear side of the machine. And the free ends of the leads are bent so as to extend at substantially right angles to the body portion of the leads, these ends of the outer leads 23 being bent inwardly, and the ends of the inner leads 21 being bent outwardly; and the bent terminal portions of the leads are provided with one or more apertures to permit connecting adjacent leads together, mechanically and electrically, by one or more bolts 26 or the like.

As a preliminary to making the connection between the end of the body portion of each lead and the edge of the strap conductor 19, this end of the lead is ground or machined to provide a plane surface extending at an angle of substantially 45 degrees to the longitudinal axis of the body portion of the lead, and the corresponding corner portion of the inner or outer convolution of the coil is likewise machined to provide a similar plane surface at the edge against which the machined end of the lead will lie, with the body of the lead extending in substantial prolongation of the front or rear side of the end convolution. These operations and the subsequent operation of connecting the leads to the edge of the end convolutions of the coil are performed with greater facility if the end convolutions are temporarily drawn away from the adjacent convolutions.

The matched machined surfaces of a lead and the corresponding end convolution of the coil may then be brought into position and integrally united by fusion of metal of the parts by butt-welding the lead to the end convolution, or preferably by silver soldering the parts together, as by inserting a thin layer of silver solder between the adjacent surfaces of the parts to be connected and pressing the parts together during or immediately following the application of heat of sufficient degree to the silver solder and the adjacent parts to be connected, to cause the parts to be securely and intimately united through a fused metal joint of desired mechanical and electrical characteristics. Particularly since the line of union, indicated at 27, between the connected parts of the end convolutions 24 and 25 and the leads 21 and 23, respectively, are within the outline of the formed coil, it is desirable that excess thickness at the butt joints be avoided so that the outer and inner convolutions of the coil may have the fullest engagement with the end collars 16 and 17. And the use of a silver solder joint of the above described character is advantageous since, in addition to providing a fused metal union between the parts which is of the desired mechanical and electrical characteristics, such a joint is not so apt to produce excess thickness at the joint between the parts, and any excess thickness of metal produced at such a soldered joint may be readily reduced.

While the leads are described hereinabove as being connected to corner portions of the end convolutions of the coil, it will be apparent that the suitably formed end of the lead may readily be connected by a fused metal joint of the character described hereinabove to an edge of one of the straight side portions or the front or rear side of the coil; and that with the end face of the lead to be connected to the coil suitably cut at any desired angle to the body portion of the lead, the latter may be suitably connected to the coil and led off therefrom in any desired direction.

While the field coil conductor to which the leads are connected, as referred to hereinabove, is described as being of rectangular cross-sectional shape, it will be apparent that the invention is readily applicable to coils formed of a conductor of special cross-sectional shape to provide increased heat-dissipating surface or the like.

It will be apparent that through the use of the present invention, there is provided a formed coil winding of minimum overall length and having leads securely connected thereto in a manner which permits use of a minimum weight of conductive material for the leads and readily permits having the leads extend in any desired direction from the coil.

It should be understood that the invention claimed is not limited to the exact details of construction and design described herein, for obvious modifications within the scope of the appended claims will be apparent to persons skilled in the art.

It is claimed and desired to secure by Letters Patent:

1. In a dynamo-electric machine, a core of magnetic material having a plurality of projecting field elements, winding coils on said field elements, said coils each comprising a plurality of superposed convolutions of conductive material, and a conductive lead butt-connected by fusion of metal to an outer edge, with respect to the axis of the coil, of a portion of one of said convolutions.

2. In a dynamo-electric machine, a core of magnetic material having a plurality of projecting field elements, winding coils on said field elements, said coils each comprising a plurality of convolutions formed from an edgewise wound strap conductor of extended width transversely of the axis of the coil and of reduced thickness, and a conductive lead butt-connected to an outer edge, with respect to the axis of the coil, of a portion of one of the said convolutions.

3. In a dynamo-electric machine, a field core including a plurality of projecting field poles, winding coils on said poles, said coils each comprising a plurality of convolutions formed from an edgewise wound strap conductor of extended width transversely of the axis of the coil and of reduced thickness, and a conductive lead connected to an outer edge, with respect to the axis of the coil, of an end convolution of the coil through a butt-connection between said parts, said lead extending from said end convolution in substantially straight prolongation of the portion of the convolution to which the lead is connected.

4. In a dynamo-electric machine, a field core including a plurality of projecting field poles, winding coils on said poles, said coils each comprising a plurality of convolutions formed from an edgewise wound strap conductor of extended width transversely of the axis of the coil and of reduced thickness, and a conductive lead connected to an outer edge, with respect to the axis of the coil, of an end convolution of the coil through a fused metal butt-connection between said parts, the thickness of the connection between the parts being substantially the same as that of the portion of the end convolution to which the lead is connected.

5. In a dynamo-electric machine, a field element including a plurality of projecting field poles, winding coils on said poles, said coils each comprising a plurality of convolutions formed from an edgewise wound strap conductor of extended width transversely of the axis of the coil and of reduced thickness, and a conductive lead connected to an outer edge, with respect to the axis of the coil, of an end convolution of the coil through a fused metal butt-connection between said parts and extending from said convolution in substantially straight prolongation of the portion thereof to which the lead is connected, and the thickness of the butt-connection between the parts being substantially the same as that of the portion of the end convolution to which the lead is connected.

6. In a dynamo-electric machine, a field element including a plurality of projecting field poles, winding coils on said poles, said coils each comprising a plurality of superposed convolutions of conductive material, and a conductive lead butt-connected by fusion of metal to the outer edge, with respect to the axis of the coil, of an end convolution of the coil, leads from adjacent coils emerging in opposite directions from adjacent coils and having their ends bent at substantially right angles to the body portion of the leads, and means for connecting together the bent outer ends of said leads.

7. In a dynamo-electric machine, a field element including a plurality of projecting field poles, winding coils on said poles, said coils each comprising a plurality of convolutions formed from an edgewise wound strap conductor of extended width transversely of the axis of the coil and of reduced thickness, and a conductive lead connected to an outer edge, with respect to the axis of the coil, of an end convolution of the coil through a fused metal butt-connection between the parts and extending from said convolution in substantially straight prolongation of the portion thereof to which the lead is connected, leads from adjacent coils emerging in opposite directions from said coils and having their ends bent at substantially right angles to the body portion of the leads, and means for connecting together the bent outer ends of said leads.

8. A winding coil for electrical apparatus, comprising a plurality of superposed convolutions of edgewise wound, conductive material, and a conductive lead butt-connected through fusion of metal to an outer edge surface portion of a convolution of the coil.

9. A winding coil for electrical apparatus, comprising a plurality of superposed convolutions of edgewise wound, conductive strap material, and a conductive lead of strap material butt-connected to an outer edge surface of a convolution of the coil.

10. A winding coil for electrical apparatus, comprising a plurality of superposed convolutions of edgewise wound, conductive strap material, and a conductive lead of substantially the same cross-sectional area as the conductor from which said coil is formed and having a fused metal butt-connection to an edge surface portion of an end convolution of the coil and extending in substantially straight prolongation of the portion of said end convolution to which said lead is connected.

11. A winding coil for electrical apparatus, comprising a plurality of superposed convolutions of edgewise wound, conductive strap material, and a conductive lead butt-connected through fusion of metal to a cut-away plane surface of a portion of normally rounded contour on an end convolution of the coil, said connected lead extending in substantially straight prolongation of the portion of said end convolution to which the lead is connected.

12. A winding coil for electrical apparatus, comprising a plurality of superposed convolutions of edgewise wound, conductive strap material, an outer edge portion of normally rounded contour of a convolution of the coil being provided with a cut-away plane surface, and a conductive lead of strap material butt-connected through a fused metal joint to said plane surface edge of said end convolution.

13. A winding coil for electrical apparatus, comprising a plurality of superposed convolutions of edgewise wound, conductive strap material, an outer edge portion of normally rounded contour of an end convolution of the coil being provided with a plane surface, and a conductive lead of strap material butt-connected by fusion of metal to said plane surface edge of said end convolution and extending in substantially straight prolongation of the portion of said end convolution to which said lead is connected.

14. In a dynamo-electric machine, a core of magnetic material including a plurality of projecting field poles, winding coils on said poles, said coils each comprising a plurality of convolutions formed from an edgewise wound strap conductor of extended width transversely of the axis of the coil and of reduced thickness, and a conductive lead connected to an outer edge, with respect to the axis of the coil, of an end convolution of the coil through a fused metal butt-connection between the parts.

15. In a dynamo-electric machine, a core of magnetic material, a field winding carried thereby and comprising a coil having a plurality of convolutions formed from an edgewise wound strap conductor of extended width transversely of the axis of the coil and of reduced thickness, and a conductive lead connected to an edge surface portion of an end convolution of the coil through a fused metal butt-connection between the parts.

16. A winding coil for electrical apparatus, comprising a conductor of strap material in the form of a plurality of convolutions, and a conductive lead connected to an edge surface portion of an end convolution of the coil through a fused metal butt-connection between the parts.

SÖREN H. MORTENSEN.